United States Patent [19]

Burns et al.

[11] 4,100,094
[45] Jul. 11, 1978

[54] NOVEL CELLULOSE ETHERS AND DETERGENT COMPOSITIONS CONTAINING SAME

[75] Inventors: Michael E. Burns, West Chester; Hans J. Pracht, Cincinnati, both of Ohio

[73] Assignee: The Procter & Gamble Company, Cincinnati, Ohio

[21] Appl. No.: 805,946

[22] Filed: Jun. 13, 1977

Related U.S. Application Data

[62] Division of Ser. No. 654,431, Feb. 2, 1976, Pat. No. 4,048,433.

[51] Int. Cl.$^2$ .................. C11D 1/02; C11D 1/66; C11D 1/94

[52] U.S. Cl. .................. 252/89 R; 252/8.8; 252/8.9; 252/132; 252/135; 252/DIG. 2; 252/15; 252/531; 252/532; 252/558; 252/559; 536/99; 536/88

[58] Field of Search .................. 252/89 R, DIG. 15, 2, 252/531, 532, 535, 539, 540, 550, 551, 554, 555, 559, 132, 135, 8.8, 8.9; 536/99, 88

[56] References Cited

U.S. PATENT DOCUMENTS

| | | | |
|---|---|---|---|
| 3,920,561 | 11/1975 | Desmarais | 252/542 X |
| 4,000,093 | 12/1976 | Nicol et al. | 252/DIG. 15 |

Primary Examiner—Mayer Weinblatt
Attorney, Agent, or Firm—Rose Ann Dabek; Julius P. Filcik; Richard C. Witte

[57] ABSTRACT

Novel cellulose ethers having a molecular weight from 3000 to 10,000 and a methyl degree of substitution of from 1.8 to 2.7 are especially useful as soil release agents in detergent compositions.

17 Claims, No Drawings

NOVEL CELLULOSE ETHERS AND DETERGENT COMPOSITIONS CONTAINING SAME

CROSS-REFERENCE TO RELATED APPLICATION

This is a divisional application of application Ser. No. 654,431, filed Feb. 2, 1976, now issued as U.S. Pat. No. 4,048,433.

BACKGROUND OF THE INVENTION

This invention relates to novel cellulose ethers and detergent compositions containing the cellulose ethers as a soil release agent. More particularly, this invention relates to cellulose ethers having a low molecular weight and a high degree of methyl substitution. Detergent compositions containing the cellulose ethers give soil release properties to wash fabrics thereby rendering the fabrics easier to clean in subsequent washings.

Cellulose ethers are a well known class of materials. They are generally derived from vegetable tissues and fibers, including especially cotton and wood. The molecular weight of such cellulose ethers vary from about 19,000 to about 185,000. The molecular weight of the cellulose materials can be reduced by various means including aqueous acid hydrolysis, oxidative depolymerization, and by reaction with gaseous hydrogen chloride. For example, see U.S. Pat. No. 3,391,135, July 2, 1968, Ouno et al, and British Patent No. 1,139,637, published Jan. 8, 1969. Changing the molecular weight of a cellulose ether necessarily affects its physical properties.

The hydroxyl groups of the anhydroglucose unit of cellulose can be reacted with various agents thereby replacing the hydrogen of the hydroxyl with the reacting agent. For example, various alkylating and hydroxyalkylating agents have been reacted with cellulose materials to produce alkyl cellulose ethers and hydroxyalkyl cellulose ethers. The degree of substitution may vary up to 3.0 since there are three available positions on each anhydroglucose unit. The kind of substitution and degree thereof also has an effect on the physical properties of the cellulose material.

Detergent compositions containing various soil release agents are known. In particular, various cellulose ethers have been used in detergent compositions for the soil release benefit they are able to impart to washed fabrics. For example, see U.S. Pat. Nos. 3,668,000; 2,994,665; 3,523,088; South African Patent Application 71,5149; and British Patent No. 1,171,877. Copending commonly assigned applications, Ser. No. 560,769, "Detergent Composition", Nichol; Ser. No. 560,764, "Alkyl Sulfate Detergent Composition", Nichol et al; and Ser. No. 560,766, "Alkyl Benzene Sulfonate Detergent Composition", Burns et al, all filed Apr. 2, 1975, disclose the use of cellulose ethers including methyl cellulose ethers in detergent compositions.

While certain of the prior art cellulose ethers have been able to efficiently and effectively deposit upon fabrics and thus provide a soil release benefit, there are consequent negatives involved. It has been found that deposition of certain prior art cellulose ethers on fabrics causes a negative in particulate soil removal. More specifically, when such treated fabrics are subsequently stained with particulate soil, e.g. clay, and washed, the stains are more difficult to remove. It is believed the cellulose ether provides a bonding sight for the particulate soil, thus causing its removal to be more difficult.

It is an object of this invention to provide novel cellulose ethers suitable for use in detergent compositions.

It is another object of this invention to provide detergent compositions which impart soil release properties to fabrics without causing particulate soil removal negatives.

Still another object of this invention is to provide detergent compositions which impart oily soil release properties to fabrics without causing particulate soil removal negatives.

These and other objects of the invention will become apparent from the description to follow.

As used herein, all percentages and ratios are by weight unless otherwise specified.

SUMMARY OF THE INVENTION

Novel cellulose ethers having a molecular weight of from 3,000 to 10,000 and a methyl degree of substitution of from 1.8 to 2.7 are provided.

Detergent compositions consisting essentially of from 0.1% to 5% of the aforementioned novel cellulose ether, from 5% to 65% of an organic surfactant selected from the group consisting of nonionic, anionic, ampholytic and zwitterionic surfactants and mixtures thereof and the balance detergency adjunct materials are also provided.

DETAILED DESCRIPTION OF THE INVENTION

The cellulose ethers of this invention have a low molecular weight and a high degree of methyl substitution. The cellulose ethers have the following structure.

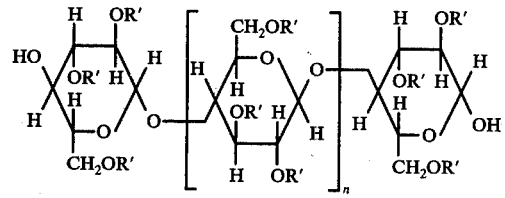

wherein R' is hydrogen or methyl with the proviso that the average degree of methyl substitution on the anhydroglucose unit is from 1.8 to 2.7; n in the above formula ranges from 14 to 54. This corresponds to a molecular weight of from 3,000 to 10,000 as measured by known ultracentrifuge techniques. Preferably the molecular weight ranges from 3,500 to 8,000, more preferably from 4,000 to 5,500.

Natural cellulose materials such a wood pulp, cotton linters, etc. have a molecular weight ranging from 250,000 to 1,000,000 or greater. The cellulose ethers of this invention are prepared from the natural cellulose materials. The cellulose material is methylated and then has its degree of polymerization reduced or it is initially reduced in degree of polymerization and then methylated.

Known processes for methylating cellulose are used. Such processes involve, for example, simply combining methyl chloride with the cellulose under alkaline conditions. Such a process results in a degree of substitution (DS) methyl of below 2 and most generally a DS methyl of about 1.5. Higher degrees of methyl substitution are obtained by exhaustive methylation of cellulose using a methyl halide, preferably methyl chloride and caustic, preferably sodium hydroxide in a pressure vessel in a manner well known in the art for preparing the lower degrees of methyl substituted celluloses; the methylation procedure is simply repeated and continued until the desired degree of substitution is secured. The progress of the methylation reaction is monitored by periodically sampling the reaction product and determining the degree of methylation. The cellulose ethers of this invention have a DS methyl of from 1.8 to 2.7, preferably 2.1 to 2.4.

The methyl cellulose ether then has its degree of polymerization reduced by a gaseous hydrogen chloride, aqueous acid hydrolysis or oxidative depolymerization step.

When the gaseous hydrogen chloride step is used, the methyl cellulose ether (in a comminuted or powdered form) is reacted with the hydrogen chloride at a level less than 5%, preferably about 2% by weight of the methyl cellulose ether. The reaction is carried out at a temperature of from 30° C to 80° C. The amount of hydrogen chloride, reaction temperature and reaction time are adjusted to get the desired depolymerization. Further details as to this process step are found in U.S. Pat. No. 3,391,135, Ouno, et al, July 2, 1968, the disclosure of which is herein incorporated by reference.

Aqueous acid hydrolysis of cellulose ethers with resultant depolymerization is well known. Basically, a solution of the methyl cellulose ether is reacted with an aqueous acid, e.g. hydrogen chloride or phosphoric acid. The temperature of reaction varies from 20° C to 100° C. The length of time the reaction is allowed to proceed is dependent upon the acid concentration, reaction temperature, degree of polymerization of the starting reactant and depolymerization desired. Generally, a reaction time of from 5 minutes to 2 hours results in a methyl cellulose ether having the desired molecular weight.

Oxidative depolymerization using periodic acid is also used to reduce the molecular weight of the methyl cellulose ether. Periodic acid is reacted with the methyl cellulose ether at a temperature of from 20° C to 90° C for 30 minutes to 24 hours, said conditions being dependent upon acid strength and degree of depolymerization desired. The resultant methyl cellulose ether prepared in this manner is preferably used in neutral pH detergent compositions. Other known oxidation depolymerization reactions such as those using oxygen gas or hydrogen peroxide can be used.

Methyl cellulose ethers having the desired molecular weight and DS methyl are also prepared by initially reducing the molecular weight of alkali cellulose and then methylating. Natural cellulose is mixed with an alkali source, e.g. sodium hydroxide to produce alkali cellulose and thereafter aged until the desired molecular weight is obtained. The aging process is accelerated by passing oxygen through the alkali cellulose or by adding hydrogen peroxide to it. Such oxidative processes are well known. The resultant cellulose is then methylated to a DS methyl of greater than 1.8 in the manner above described.

The above described methyl cellulose ethers are useful as a component of a detergent composition. The cellulose ether acts as an oily soil release agent. It effectively and efficiently deposits from the wash solution onto fabrics. When the fabrics are subsequently soiled and washed, the presence of the cellulose ether allows the soil to be more easily removed. Unexpectedly, the ease of removing particulate soil, especially clay, is not adversely affected by the presence of the instant cellulose ether (as opposed to prior art cellulose ethers) on the fabrics. It is believed particulate soil is less tightly bound to the low molecular weight high DS methyl cellulose ethers herein and thus are removed more easily. The detergent compositions herein are especially useful in imparting a soil release benefit to polyester fabrics.

Detergent compositions intended for use in a home laundering operation contain an organic surfactant and detergency adjunct materials as well as the cellulose ether above described.

Detergent compositions contain from 0.1% to 5%, preferably 0.5% to 2% of the cellulose ether, from 5% to 65% of an organic surfactant, and the balance detergency adjunct materials. The organic surfactant is selected from the group consisting of anionic surfactants, nonionic surfactants, ampholytic surfactants, zwitterionic surfactants and mixtures thereof. U.S. Pat. No. 3,664,961, May 23, 1972, Norris, column 2, line 68 to column 9, line 3, describes suitable surfactants useful herein. (The disclosure of this patent is herein incorporated by reference.) The anionic and nonionic surfactants are preferred. Especially preferred nonionic surfactants are the alkyl ethoxylates having 8 to 20, preferably 10 to 18 carbon atoms in the alkyl group and 3 to 30, preferably 3 to 15 ethylene oxide groups.

Non-limiting examples of adjunct materials which can be used in the detergent compositions herein include soil suspending agents, such as carboxymethyl cellulose, various perfumes, optical bleaches, processing aids, anti-caking agents, alkalinity sources, and builders. These components provide the usual benefits occasioned by the use of such materials in detergent compositions. Perborate bleaches also may be present as a component of the instant detergent compositions. Enzymes, especially the thermally stable proteolytic and amylolytic enzymes commonly used in laundry detergent compositions, can also be used in the herein disclosed compositions.

When the detergent composition is intended for industrial cleaning, a source of alkalinity, e.g. sodium or potassium hydroxide, is added at a level sufficient to raise the pH of the wash solution to about 12. Generally, the alkalinity source is added to such a detergent composition at a level up to 20% of the composition.

The detergent compositions of this invention are formulated in any physical form, for example, solid (powder or granular), liquid or paste form. The detergent compositions are processed in a normal manner. Powder or granular compositions are prepared by simply dry mixing the components. More commonly, however, a spray drying process is used in the preparation of a spray dried detergent granule. An aqueous mixture of the various components of the granules is sprayed or otherwise introduced into what is essentially a drying tower. As the droplets of the aqueous mixture proceed through the drying tower, the water is driven off and solid detergent granules are secured.

Powder or granular detergent compositions are generally used for heavy duty laundering and contain from 0.1% to 3%, preferably 0.5% to 2% cellulose ether, from 5% to 35%, preferably 8% to 20% of the surfactant and from 10% to 80%, preferably from 25% to 75% detergency builder and the balance detergency adjunct materials. Any of the known compounds possessing builder properties are useful herein. U.S. Pat. No. 3,664,961, May 23, 1972, Norris, column 9, lines 4–35, describes suitable detergency builders. (The disclosure of this patent is herein incorporated by reference.) Suitable detergency builders also include the water-insoluble aluminosilicates described in German patent application 2,422,655, Corkill et al., published Nov. 28, 1974 (the disclosure of which is herein incorporated by reference).

Liquid detergent compositions comprising the cellulose soil release agent are prepared by simply dissolving or suspending the cellulose ether in a liquid carrier, preferably water or water-alcohol mixtures and adding any suitable surfactant thereto. The liquid detergent compositions contain from 0.1% to 5%, preferably 0.5% to 3% of the cellulose ether. The amount of surfactant in such compositions is from 5% to 65%, preferably 20% to 50% of the composition. The liquid compositions contain from 0% to 10%, preferably 0.5% to 5% of an electrolyte salt, e.g. potassium chloride or potassium hydroxide. The presence of the electrolyte salt prevents gellation of the surfactant upon dilution with water. Fluidity of the liquid detergent composition is provided by means of a liquid carrier. Liquid carriers useful herein include water, and mixtures of water ahd $C_1$ to $C_4$ alcohols in a ratio of water to alcohol of from 30:1 to 3:1 and constitute the balance of the compositions.

The following examples are illustrative of the invention.

EXAMPLE I

Preparation of a Cellulose Ether of Molecular Weight 5,500 and DS Methyl 2.60, by Reaction of Alkali Cellulose with Methyl Chloride in the Presence of Hydrogen Peroxide A pressure vessel is charged with 4540 g of powdered cellulose, 1500 g of water, and 4500 g of solid sodium hydroxide. The vessel is heated with agitation to 90° C for 0.5 hr., cooled to 0° C, and charged with 1820 g of 30% hydrogen peroxide followed by 4540 g of methyl chloride. The vessel is sealed and heated to 120° C with agitation for 3 hrs. After cooling to 25° C, the vessel is vented and an additional 4500 g of solid sodium hydroxide is added followed by 1820 g of 30% hydrogen peroxide. The vessel is cooled to 0° C, charged with an additional 4540 g of methyl chloride, sealed, and heated to 120° C for 3 hours. After cooling to 25° C, the vessel is vented and the reaction mixture centrifuged. The solid product is suspended in hot water, centrifuged, and air dried. The yield is 5740 g (85%) of methyl cellulose of molecular weight 5,500 (ultracentrifuge) and DS methyl 2.60.

EXAMPLE II

Preparation of a Cellulose Ether of Molecular Weight 7500 and DS Methyl 2.61, by Oxidation of a Higher Molecular Weight Cellulose Ether With Periodic Acid 100 g of a methyl cellulose having DS 2.50 and molecular weight 140,000 is suspended in 1 liter of water at 90° C. The suspension is cooled in an ice bath and a solution of 115 g of periodic acid in 500 ml of water is added. The resulting suspension is stirred at room temperature for 16 hours, warmed to 90° C, and the precipitated cellulose ether collected by filtration. After freeze drying, the cellulose ether (81 g) has a molecular weight (ultracentrifuge) of 7500 and DS methyl of 2.61.

EXAMPLE III

PREPARATION OF A CELLULOSE ETHER OF MOLECULAR WEIGHT 4,000 AND DS METHYL 2.34, BY AQUEOUS ACID HYDROLYSIS OF A HIGHER MOLECULAR WEIGHT CELLULOSE ETHER 20 g of a methyl cellulose having DS 2.24 and molecular weight 43,000 is suspended in 480 g of water at 90° C. The suspension is cooled in an ice bath to dissolve the cellulose ether and 500 ml. of 6 N HCl is added. The resulting solution is stirred at 40 C. The depolymerization of the cellulose ether is followed by monitoring the viscosity of the solution. After four hours at 40° C, the 2% aqueous viscosity of the reaction mixture is reduced to 3 Cp. and the celulose ether is precipitated by warming the solution to 90° C. After filtration and freeze drying, the cellulose ether has a molecular weight of 4,000 (ultracentrifuge) and Ds methyl of 2.34.

EXAMPLE IV

The methyl cellulose ethers of this invention are tested for their soil release properties in the manner described below. The following base formula is used in the testing.

| Base Formula | Percent |
| --- | --- |
| $C_{12-13}$ (EO)$_5$ | 11.0 |
| Sodium tripolyphosphate | 32.0 |
| Sodium carbonate | 10.0 |
| Sodium silicate (SiO$_2$:Na$_2$O = 2.0) | 8.0 |
| Sodium sulfate | 24.4 |
| Sodium C$_{18}$ fatty acid | 1.1 |
| Bentonite clay | 5.0 |
| Miscellaneous (water, antioxidants and brighteners) | Balance |

Polyester swatches are prewashed in a Tergotometer at 40° C, with 0.18% of formulations 1–4 as indicated below. Formulations 1–4 comprise the base formula plus the indicated levels of the methyl cellulose ether of Example I. The hardness of the water is 7 grains/gal. of mixed Ca and Mg hardness (2:1 ratio). After the prewash, the swatches are individually soiled with dirty motor oil, vegetable oil, bacon grease, margarine, and suntan oil. The soiled swatches are aged overnight before washing. The stained swatches are washed in a Tergotometer at 40° C, 7 grains/gal. mixed Ca/Mg hardness water with 0.18% of the base formula. Percent removal of the various greasy/oily soils is determined gravimetrically. Results are tabulated below.

| Prewash Formulations | 1 | 2 | 3 | 4 |
| --- | --- | --- | --- | --- |
| Methyl cellulose ether | 0% | 0.7% | 1.0% | 1.3% |
| Base Formula | bal. | bal. | bal. | bal. |
| Prewash Formulations | 1 | 2 | 3 | 4 |
| Soils | \multicolumn{4}{c}{% Soil Removal} | | | |
| Dirty motor oil | 32 | 75 | 87 | 98 |
| Vegetable oil | 18 | 54 | 85 | 96 |
| Bacon grease | 33 | 82 | 88 | 97 |
| Margarine | 20 | 84 | 94 | 100 |
| Suntan oil | 83 | 90 | 96 | 99 |

The above results show that fabrics which have been washed with a detergent composition containing the methyl cellulose ethers of this invention (Formulation 2-4), stained with various greasy/oily soils, and subsequently washed are able to have such soils more completely removed than fabrics washed with the control detergent composition (Formulation 1).

EXAMPLE V

The ability of the deposited cellulose ether of this invention to provide oily soil release without causing a particulate soil removal negative is demonstrated by this example.

White knit polyester swatches are washed in a Tergotometer at 40° C. Wash load A contains 12 ppm of a methyl cellulose ether having a M.W. = 120,000 and DS methyl = 2.2. Wash load B contains 12 ppm of a methyl cellulose ether having M.W. = 4000 and DS methyl = 2.3. Wash load C contains no cellulose ether. Each set of swatches is dried and then soiled with a clay slurry. After drying, the three sets of clay-soiled swatches are individually washed in the Tergotometer under the same conditions as above and in the presence of a detergent composition having the following formulation.

| Component | Percent |
| --- | --- |
| Sodium $C_{12}$ linear alkyl benzene sulfonate | 7.6 |
| Sodium tallow alkyl sulfate | 9.4 |
| Sodium tripolyphosphate | 50 |
| Sodium silicate | 6.0 |
| Sodium sulfate | 15.0 |
| Misc. (water, brightener and perfume) | Bal. |

The respective swatches are dried and graded with a Hunter Color Difference Meter. The results are:

| Wash Load | Hunter Whiteness Units |
| --- | --- |
| A | −5 |
| B | 65 |
| C | 68 |

The above results show that fabrics washed in the presence of the methyl cellulose ether of this invention (wash load B), subsequently soiled with clay and washed with a detergent composition show no clay soil removal negative with respect to the control (fabrics from wash load C). However, fabrics prewashed in the presence of a prior art methyl cellulose ether (wash load A), soiled with clay and washed again with a detergent composition do show a clay soil removal negative with respect to the control.

At the same time, the methyl cellulose ether of wash load B imparts greasy/oily soil removal benefits to fabrics superior to that obtained from the wash load containing no methyl cellulose ether, i.e. wash load C.

EXAMPLE VI

An example of a liquid detergent composition useful for heavy-duty laundering is as follows:

| Component | Wt. % |
| --- | --- |
| Condensation product of 6 moles of ethylene oxide with coconut fatty alcohol | 33.0 |
| Triethanolamine salt of linear alkyl benzene sulfonic acid wherein the alkyl chain averages 11.2 carbon atoms in length | 16.1 |
| Triethanolamine oleate | 2.3 |
| Methyl cellulose ether (DS methyl = 2.1 and MW = 6,000) | 2.0 |
| Free triethanolamine | 5.3 |

| Component | Wt. % |
| --- | --- |
| Ethanol | 5.5 |
| Potassium chloride | 2.5 |
| Brighteners, perfume, dye | 1.2 |
| Water | Balance |

This composition is able to impart satisfactory oily soil removal benefits to fabrics washed therewith.

What is claimed is:

1. A detergent composition having soil release properties consisting essentially of (a) from 5% to 65% by weight of a water-soluble organic surfactant selected from the group consisting of nonionic, anionic, ampholytic and zwitterionic surfactants and mixtures thereof; (b) from 0.1% to 5% by weight of a methyl cellulose ether having the structure

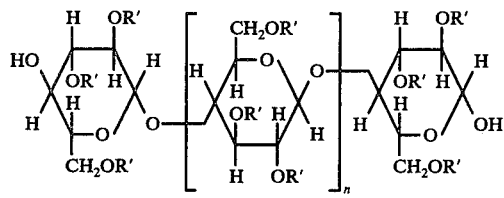

wherein R' is hydrogen or methyl provided the average degree of methyl substitution on the anhydroglucose unit is from 1.8 to 2.7, n ranges from 14 to 54 and having a molecolar weight of from 3,000 to 10,000; and (c) the balance detergency adjunct materials.

2. The detergent composition of claim 1 wherein the organic surfactant is a nonionic surfactant.

3. The detergent composition of claim 1 wherein the methyl cellulose has a molecular weight of from 3500 to 8000.

4. The detergent composition of claim 3 wherein the methyl cellulose ether has a molecular weight of from 4,000 to 5,500 and a DS methyl of from 2.1 to 2.4.

5. The detergent composition of claim 1 in a solid form consisting essentially of from 0.1% to 3% of the methyl cellulose ether, from 5% to 35% of the organic surfactant and from 10% to 80% of a detergency builder.

6. The detergent composition of claim 5 wherein the methyl cellulose ether has a molecular weight of from 3500 to 8000.

7. The detergent composition of claim 6 wherein the detergency builder is present in an amount from 25% to 75%.

8. The detergent composition of claim 7 wherein the organic surfactant is present in an amount from 8% to 20%.

9. The detergent composition of claim 8 wherein the methyl cellulose ether is present in an amount from 0.5% to 2%.

10. The detergent composition of claim 9 wherein the methyl cellulose ether has a molecular weight of from 4000 to 5500 and a DS methyl of from 2.1 to 2.4.

11. The detergent composition of claim 10 wherein the surfactant is a nonionic surfactant.

12. The detergent composition of claim 11 wherein the nonionic surfactant is an alkyl ethoxylate having from 8 to 20 carbon atoms in the alkyl group and from 3 to 30 ethylene oxide groups.

13. The detergent composition of claim 1 in a liquid form consisting essentially of from 0.1% to 5% of the methyl cellulose ether, from 5% to 65% of the organic surfactant and the balance liquid carrier.

14. The detergent composition of claim 13 wherein the methyl cellulose ether has a molecular weight of from 4000 to 5500 and a DS methyl of from 2.1 to 2.4.

15. The detergent composition of claim 14 wherein the organic surfactant is a nonionic surfactant.

16. The detergent composition of claim 15 additionally containing from 0.5% to 5% of an electrolyte.

17. The detergent composition of claim 16 wherein the electrolyte is potassium chloride or potassium hydroxide.

* * * * *